United States Patent
Peana et al.

(10) Patent No.: US 9,830,888 B2
(45) Date of Patent: Nov. 28, 2017

(54) GAZE DRIVEN DISPLAY FRONT OF SCREEN PERFORMANCE

(71) Applicant: Dell Products, LP, Round Rock, TX (US)

(72) Inventors: Stefan Peana, Austin, TX (US); Deeder M. Aurongzeb, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 9 days.

(21) Appl. No.: 14/537,031

(22) Filed: Nov. 10, 2014

(65) Prior Publication Data

US 2016/0133221 A1    May 12, 2016

(51) Int. Cl.
*G09G 5/00*    (2006.01)
*G09G 5/36*    (2006.01)
*G09G 5/10*    (2006.01)
*G06F 3/01*    (2006.01)

(52) U.S. Cl.
CPC .............. *G09G 5/363* (2013.01); *G09G 5/10* (2013.01); *G06F 3/013* (2013.01); *G09G 2320/0613* (2013.01); *G09G 2320/0646* (2013.01); *G09G 2320/0686* (2013.01); *G09G 2330/021* (2013.01); *G09G 2330/023* (2013.01); *G09G 2354/00* (2013.01)

(58) Field of Classification Search
CPC .............. G09G 5/00; G09G 2320/0686; G09G 2320/0626; G06F 3/013

USPC .......................................................... 345/156
See application file for complete search history.

(56) References Cited

U.S. PATENT DOCUMENTS

| | | | |
|---|---|---|---|
| 6,094,341 A | 7/2000 | Lin | |
| 7,136,282 B1 | 11/2006 | Rebeske | |
| 7,821,780 B2 | 10/2010 | Choy | |
| 2003/0142469 A1 | 7/2003 | Ponx | |
| 2005/0237269 A1 | 10/2005 | Connor et al. | |
| 2008/0111833 A1* | 5/2008 | Thorn | G09G 5/00 345/690 |
| 2009/0296331 A1 | 12/2009 | Choy | |
| 2010/0007601 A1* | 1/2010 | Lashina | G06F 3/013 345/156 |
| 2012/0288139 A1* | 11/2012 | Singhar | G06F 1/3265 382/103 |
| 2013/0127905 A1 | 5/2013 | Zhang et al. | |
| 2013/0201101 A1 | 8/2013 | Niu et al. | |

* cited by examiner

*Primary Examiner* — Towfiq Elahi
(74) *Attorney, Agent, or Firm* — Larson Newman, LLP (57) ABSTRACT

An information handling system includes a display, a gaze detector that determines a location on the display that corresponding with where a user is looking at the display, and a processor. The processor receives the location from the gaze detector, determines a non-power-reduced portion of the display that includes the location, determines a power-reduced portion of the display that is exclusive of the non-power-reduced portion, receives data associated with a pixel of an image included in the power-reduced portion, changes the data such that a first power level consumed by the display when displaying the pixel with the changed data is less than a second power level consumed by the display when displaying the pixel with the unchanged data, and sends the changed data to the display.

20 Claims, 4 Drawing Sheets

GAZE DRIVEN DISPLAY FRONT OF SCREEN PERFORMANCE

FIELD OF THE DISCLOSURE

This disclosure relates generally to information handling systems, and more particularly relates to gaze driven display front of screen performance in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
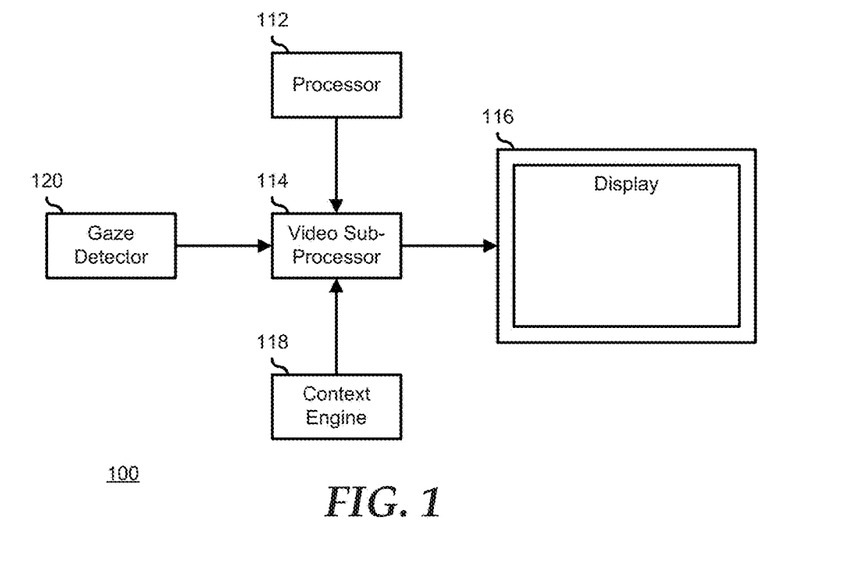
FIG. 1 is a block diagram of an information handling system according to an embodiment of the present disclosure.

FIG. 1 illustrates an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 includes a processor 112, a video sub-processor 114, a display 116, a context engine 118, and a gaze detector 120. Processor 112 represents a central processing unit (CPU) of information handling system 100 that provides the main processing functions of the information handling system, such as booting and installing an operating system (OS), and launching and executing application programs on the information handling system.

Where an application program includes video content, processor 112 operates to offload some or all of the video content processing tasks to video sub-processor 114. As such, video sub-processor 114 represents a graphical processing unit (GPU) of information handling system 100 that operates to provide powerful graphics processing such as two dimensional and 3 dimensional hardware acceleration, multiple frame buffers, color space management, hardware overlays, motion compensation, bitstream processing, pixel positioning, and the like, as needed or desired.

The images provided by video sub-processor 114 are provided to display 116 for providing a visual image associated with the application program. Thus display 116 represents a video display device such as a video monitor, a laptop display screen, a tablet device or mobile telephone device touch screen, or the like. An example of display 116 includes a liquid crystal display (LCD), an organic light emitting diode (OLED) display, or another display type, as needed or desired.

Context engine 118 represents a tracking element of information handling system 100 for determining the type and content of the images that are presented on display 116. In particular, context engine 118 operates to determine if the image includes one or more portions that are associated with different application programs, the regions of display 116 that are associated with the different portions, and what type of content is being presented. For example, context engine 118 can determine that display 116 is presenting portion of the display that includes a depiction of a web browser, and that a remainder of the display includes an operating system desktop environment. Context engine 118 further operates to determine the type of content that is being displayed within a particular application program. For example, if display 116 is presenting a web browser, then context engine 118 further operates to determine if a portion of the web browser is displaying video content and that a remainder of the web browser is showing add-space or a background image. Context engine 118 represents hardware of information handling system 100, software of the information handling system, or a combination thereof.

Gaze detector 120 represents another tracking element of information handling system 100 for determining where a user of the information handling system is focusing their attention. For example, gaze detector 120 can determine that a user is focusing on a center of display 116, at an edge of the display, at a corner of the display, or the like. In a particular embodiment, gaze detector 120 represents a camera device of information handling system 100 that is directed to the user, such as a web-cam on a laptop computer system, a video camera, such as in a teleconferencing system, an iris camera, or another device suitable for determining where the user is directing their gaze. In another embodiment, gaze detector 120 represents a combination of one of the camera devices with a software package for receiving the camera inputs and for providing an analysis of the inputs to determine where the user's eye is focused.

Information handling system 100 operates to reduce the power consumed by display 116, for example to extend battery life where the information handling system represents a mobile device. To reduce the power consumed by display 116, video sub-processor 114 receives inputs from context engine 118 and from gaze detector 120, and determines one or more power-reduced portion of the image on the display in which the power consumed by the display is reduced, without reducing the image quality for one or more other non-power reduced portion of the image. In particular, the power-reduced portion of the image can be selected based upon the input from context engine 118, based on the input from gaze detector 120, or based on a combination of the inputs from the context engine and the gaze detector, as described further below.

The way in which video sub-processor 114 operates to reduce the power consumed in the power-reduced portion of the image presented on display 116 will depend on the technology employed by the display. For example, where display 116 employs OLED technology, video sub-processor 114 has control over the color balance and light intensity for each and every pixel of the display, and the video sub-processor manipulates the inputs to the pixels in the power-reduced portion of the display such that the power consumed by those pixels is reduced. For example, in a power-reduced portion of display 116, video sub-processor 114 can maintain the color balance of the pixels, but can reduce the light intensity of those pixels, thereby darkening the power-reduced portion of the image as compared with the non-power-reduced portion of the image. The skilled artisan will recognize that other pixel manipulations can be performed on the pixels within an OLED type display to reduce the power consumed by the display in the power-reduced portion of the image.

As another example, where display 116 employs LCD technology, video sub-processor 114 has control over the color balance for each and every pixel of the display, but the light intensity is determined for multiple pixels by a common backlight light level. Here, in order to reduce the power consumed by display 116, video sub-processor 114 manipulates the inputs to the pixels in both the power-reduced portion of the display and the non-power reduced portion such that the overall power consumed by the display is reduced. For example, video sub-processor 114 can maintain the color balance of the pixels in the power-reduced portion of display 116, can increase the contrast of the pixels in the non-power-reduced portion of the display, and can reduce the backlight light level for the entire display, because compared to the increased contrast in the non-power-reduced portion, the reduction in light level of the backlight provides a net reduction in the power consumption of the LCD display. The skilled artisan will recognize that other pixel manipulations can be performed on the pixels within an LCD type display to reduce the power consumed by the display in the power-reduced portion of the image.

In a particular embodiment, video sub-processor 114 operates to reduce the power in the power-reduced portion of display 116 evenly across the portion. For example, a predetermined factor can be employed across all of the power-reduced portion, such as a predetermined power reduction factor, a predetermined brightness factor, a predetermined contrast factor, another predetermined factor, or a combination thereof. A level of the predetermined factor can be fixed, such as a hardware setting, or can be variable, such as a user definable level.

In another embodiment, video sub-processor 114 operates to vary the amount of power reduction at different locations in the power-reduced portion of display 116. For example, a pixel in the power-reduced portion of display 116 can be characterized by its distance from the non-power-reduced portion of the display. Here, the level of power reduction can across the power-reduced portion of display 116 can be increased for each pixel of the power-reduced portion as the distance from the non-power-reduced increases. In a particular embodiment, the power reduction can be linear with the distance. For example, the brightness of the pixels of the power-reduced portion that are closest to the non-power-reduced portion can have a zero (0) adjustment factor because the distance from the non-power-reduced portion is zero, and the edge of display 116 can provide 100% brightness reduction, such that the image in the power-reduced portion fades to black to the edge of the display. In another example, the brightness of the pixels of the power-reduced portion that are closest to the non-power-reduced portion can have a non-zero adjustment, making for a more marked distinction between the non-power-reduced portion and the power-reduced portion. In another embodiment, the power reduction can be based upon another non-linear power reduction factor, as needed or desired. In general, the pixel adjustment for a pixel in a reduced-power portion of display 116 can be given as:

$$[R,G,B] \times R_{BASE} \times R_{LOC} = [R',G',B'] \quad \text{Equation 1}$$

where [R,G,B] is an unadjusted color/brightness/contrast setting for a pixel in the reduced-power portion, $R_{BASE}$ is a base adjustment factor for the reduced-power portion, $R_{LOC}$ is a location based adjustment factor for the reduced-power portion, and [R',G',B'] is the adjusted color/brightness/contrast setting for the pixel.

Figure 2:
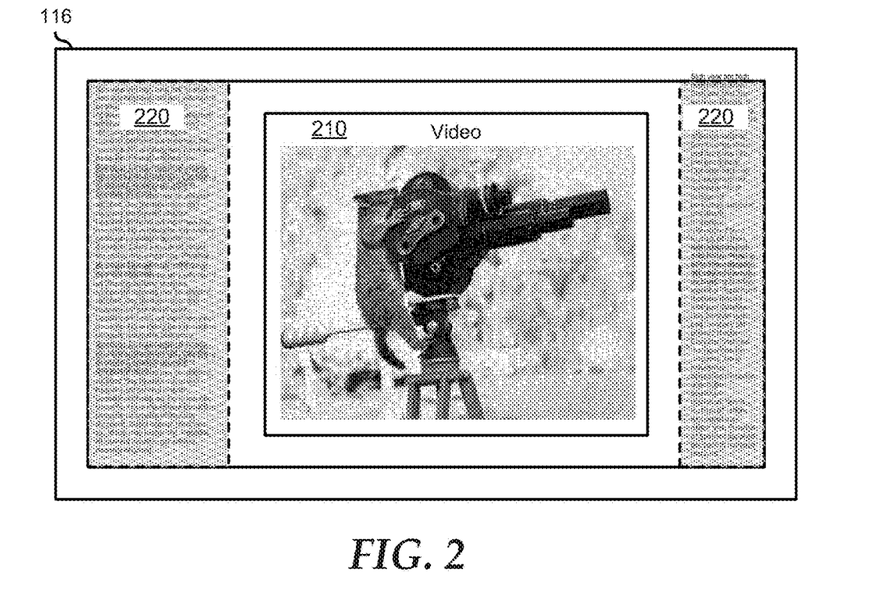
FIGS. 2-5 illustrate various embodiments for reducing the power consumed in the display of FIG. 1.

FIG. 2 illustrates display 116 where context engine 118 is utilized for reducing the power consumption of the display. Here, context engine 118 operates to determine that the portion of the image 210 that is in the middle of the display is likely to be of more interest to a user, or, alternatively, that the portions of the image 220 that are on the side of the display are likely to be of less interest to the user. For example, portion 210 can represent a video hosted on a web page, and portion 220 can represent ad-space on the web page. Context engine 118 can include a heuristic algorithm for determining that the video is more likely to be the content that a user intends to view on the web page than the ad-space content. As such, portion 210 can be designated by context engine 118 as a non-power-reduced portion of display 116, and portion 220 can be designated by the context engine as a power-reduced portion of the display. As such, video sub-processor 114 will operate to reduce the power consumption of display 116 in portion 220, as described above.

The heuristic algorithm can make a wrong determination as to which portion is the power-reduced portion of display 116 and which portion is the non-power-reduced portion of the display. As such, information handling system 100 includes a user interface (not illustrated), such as a mouse, a keyboard, a touch-screen, or the like, that provides an input to context engine 118 to correct the determination and to select a different portion as the non-power-reduced portion, to select a different portion as the power-reduced portion, or to turn off the power reduction feature. For example, where the video content in portion 220 is actually an advertisement, and the text content in portion 210 is news content, the determination that portion 220 is the non-power-reduced portion may be incorrect. Here, a user can provide an input, such as by touching a different portion of the screen, thereby designating that portion of the screen as the non-power-reduced portion. In another example, a user can provide a double-tap or a double-click on the image to turn off the power reduction feature.

Figure 3:
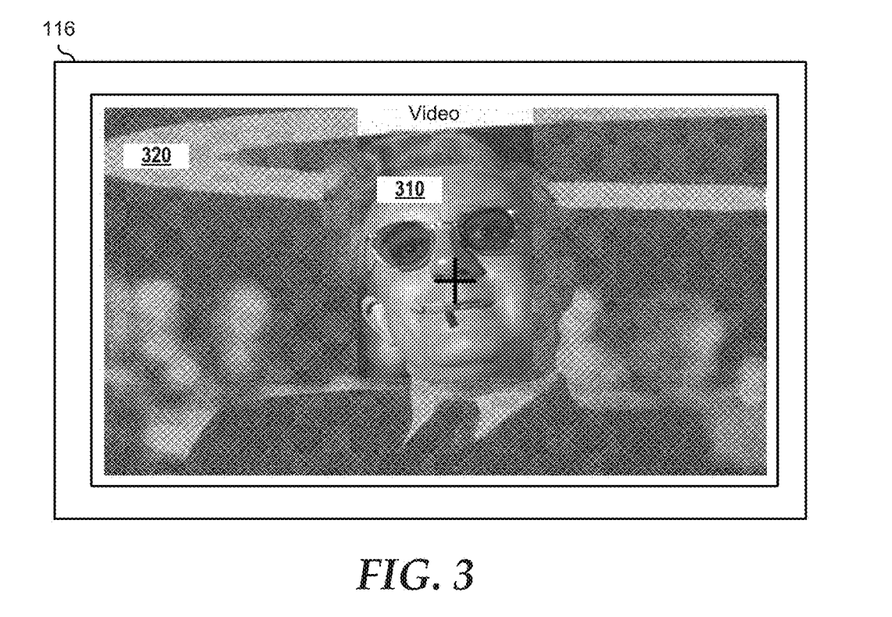

FIG. 3 illustrates display 116 where gaze detector 120 is utilized for reducing the power consumption of the display. Here, gaze detector 120 operates to determine that a user is more consistently looking at a first portion 310 of the image, and less consistently looking as a second portion 320. For example, portion 310 can represent a portion of a full-screen video that is the center of attention of the image, and portion 320 can represent another portion of the image that is more peripherally viewed by the user. As such, portion 310 can be designated by gaze detector 120 as a non-power-reduced portion of display 116, and portion 320 can be designated by the gaze detector as a power-reduced portion of the display. As such, video sub-processor 114 will operate to reduce the power consumption of display 116 in portion 320, as described above.

Figure 4:
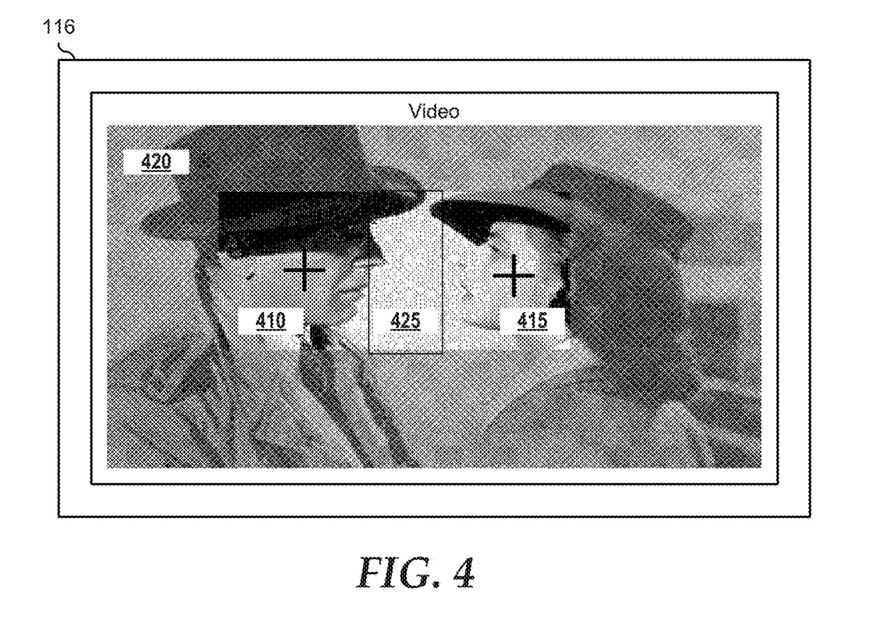

FIG. 4 illustrates another case of display 116 where gaze detector 120 is utilized for reducing the power consumption of the display. Here, gaze detector 120 operates to determine that a user is more consistently looking at several locations 410 and 415 within the image, and less consistently looking at other portions 420 and 425. However, because portion 425 is directly between portions 410 and 415, then portions 410, 415, and 425 can be designated by gaze detector 120 as a non-power-reduced portion of display 116, and portion 420 can be designated by the gaze detector as a power-reduced portion of the display. As such, video sub-processor 114 will operate to reduce the power consumption of display 116 in portion 420, as described above.

Figure 5:
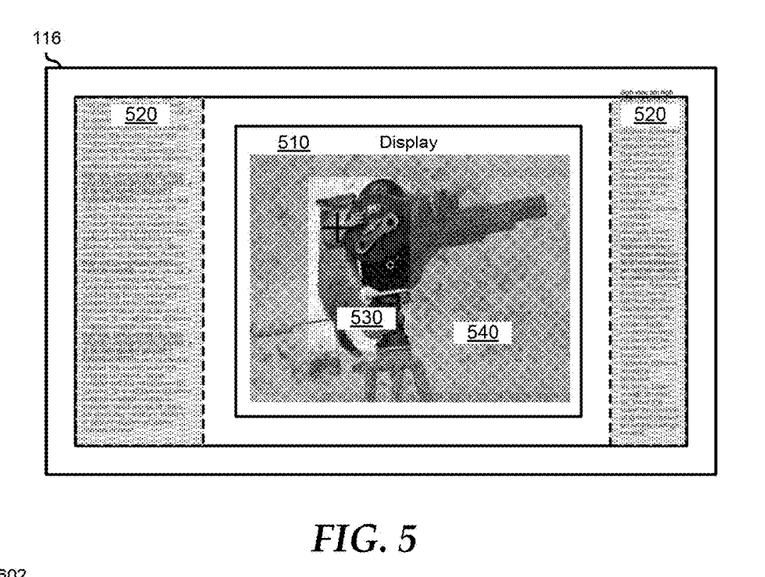

FIG. 5 illustrates display 116 where both context engine 118 and gaze detector 120 are utilized for reducing the power consumption of the display. Here, context engine 118 operates to determine that the portion of the image 510 that is in the middle of the display is likely to be of more interest to a user, or, alternatively, that the portions of the image 520 that are on the side of the display are likely to be of less interest to the user. As such, portion 520 can be designated by context engine 118 as a first power-reduced portion of the display, and portion 510 can further analyzed by gazed detector 120. Then, gaze detector 120 operates to determine that a user is more consistently looking at a first portion 530 of the image, and less consistently looking as a second portion 540 of the image. As such, portion 530 can be designated by gaze detector 120 as a non-power-reduced portion of display 116, and portion 540 can be designated by the gaze detector as a second power-reduced portion of the display. As such, video sub-processor 114 will operate to reduce the power consumption of display 116 in portions 520 and 540, as described above.

Figure 6:
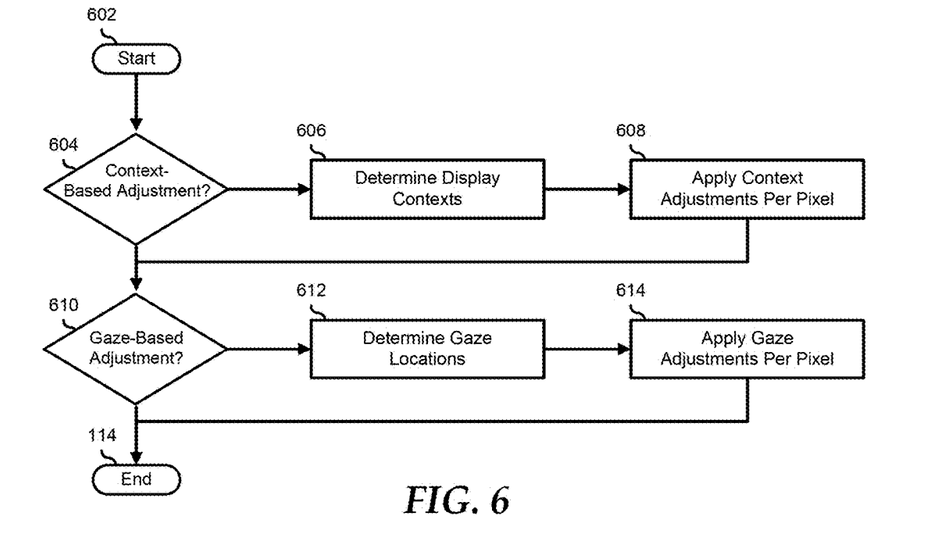
FIG. 6 is a flowchart illustrating a method for reducing the power consumption of a display in an information handling system according to an embodiment of the present disclosure.

FIG. 6 illustrates method for reducing the power consumption of a display in an information handling system, starting at block 602. A decision is made as to whether or not an information handling system is configured to use a context-based adjustment for reducing the power consumed by a display in decision block 604. For example, information handling system 100 can be configured to perform a context-based adjustment for reducing the power consumed by display 116. If the information handling system is not configured to use a context-based adjustment for reducing the power consumed by the display, the "NO" branch of decision block 604 is taken, and the method proceeds to decision block 610, as described below. If the information handling system is configured to use a context-based adjustment for reducing the power consumed by the display, the "YES" branch of decision block 604 is taken, and the contexts for one or more portions of the display are determined in block 606. Here, context engine 118 can determine if the image presented on display 116 includes one or more portions that are associated with different application programs, the regions of the display that are associated with the different portions, and what type of content is being presented. Here further, context engine 118 can determine one or more non-power reduced portion of display 116 and one or more power-reduced portion of the display. A per pixel context adjustment is applied to the pixel data in the one or more power-reduced portion of the display in block 608 and the method proceeds to decision block 610, as described below. Here, a constant adjustment factor can be applied to the pixels of the power-reduced portion of the display, a linear adjustment based upon a pixel's distance from the non-power-reduced portion of the display can be applied, or another non-linear adjustment can be applied, as needed or desired.

If the "NO" branch of decision block 604 is taken, or if, per block 608, the per pixel context adjustment is applied to pixel data in one or more power-reduced portion of the display, then a decision is made as to whether or not the information handling system is configured to use a gaze-based adjustment for reducing the power consumed by a display in decision block 610. For example, information handling system 100 can be configured to perform a gaze-based adjustment for reducing the power consumed by display 116. If the information handling system is not configured to use a gaze-based adjustment for reducing the power consumed by the display, the "NO" branch of decision block 610 is taken, and the method ends in block 616. If the information handling system is configured to use a gaze-based adjustment for reducing the power consumed by the display, the "YES" branch of decision block 610 is taken, and the location that a user of the information handling system is looking at is determined in block 612, a per pixel gaze adjustment is applied to the pixel data in the one or more power-reduced portion of the display in block 608 and the method ends in block 616.

Figure 7:
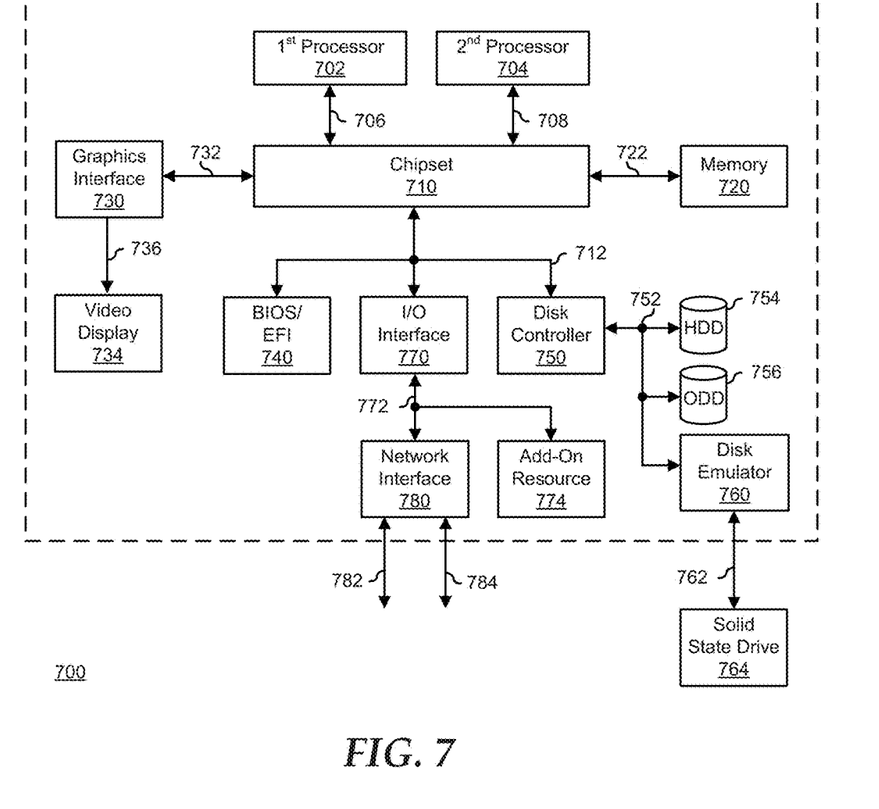
FIG. 7 is a block diagram illustrating a generalized information handling system according to an embodiment of the present disclosure.

FIG. 7 illustrates a generalized embodiment of information handling system 700. For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described above, and operates to perform one or more of the methods described above. Information handling system 700 includes a processors 702 and 704, a chipset 710, a memory 720, a graphics interface 730, include a basic input and output system/extensible firmware interface (BIOS/EFI) module 740, a disk controller 750, a disk emulator 760, an input/output (I/O) interface 770, and a network interface 780. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a display;
a gaze detector that:
   determines a first location and a second location on the display, the first and second locations corresponding with where a user is looking at the display;
   determines a third location on the display, the third location corresponding with where the user is paying less attention as compared with the first and second locations; and
   determines that the third location is between the first and second locations; and
a processor that:
   receives the first, second, and third locations from the gaze detector;
   designates a first non-power-reduced portion of the display, the first non-power-reduced portion including the first and second locations;
   designates a second non-power-reduced portion of the display, the second non-power-reduced portion including the third location, the second non-power-reduced portion being designated in response to determining that the third location is between the first and second locations;
   designates a power-reduced portion of the display, the power-reduced portion being exclusive of the first, second, and third locations;
   receives first data associated with a first pixel of an image included in the power-reduced portion;
   changes the first data such that a first power level consumed by the display when displaying the first pixel with the changed first data is less than a second power level consumed by the display when displaying the first pixel with the first data, wherein a color/brightness/contrast level for the first pixel with the changed first data ([R',G',B']) is given as:

$$[R',G',B']=[R,G,B] \times R_{BASE} \times R_{LOC},$$

where [R,G,B] is a color/brightness/contrast level for the first pixel with the first data, $R_{BASE}$ is a base adjustment factor for the power-reduced portion of the display, and $R_{LOC}$ is a location based adjustment factor for the power-reduced portion of the display; and
sends the changed first data to the display.

2. The information handling system of claim 1, wherein the processor further:
receives second data associated with a second pixel of the image; and
changes the second data such that a third power level consumed by the display when displaying the second pixel with the changed second data is less than a fourth power level consumed by the display when displaying the second pixel with the second data.

3. The information handling system of claim 2, wherein the processor further:
determines a first distance between the first pixel and one of the first and second non-power-reduced portion, wherein changing the first data is in response to determining the first distance; and
determines a second distance of the second pixel from one of the first and second non-power-reduced portion, wherein changing the second data is in response to determining the second distance;
wherein a first amount of the change of the first data is greater than a second amount of the change of the second data when the first distance is greater than the second distance.

4. The information handling system of claim 1, wherein the display comprises an organic light emitting diode type display.

5. The information handling system of claim 4, wherein in changing the first data the processor further reduces a brightness associated with the first pixel.

6. The information handling system of claim 4, wherein in changing the first data the processor further reduces a contrast associated with the first pixel.

7. The information handling system of claim 4, wherein in changing the first data the processor further changes a color balance associated with the first pixel.

8. The information handling system of claim 1, wherein the display comprises a liquid crystal display type display.

9. The information handling system of claim 8, wherein in changing the first data the processor further reduces a brightness level of a backlight associated with the liquid crystal display.

10. A method comprising:
receiving, at a processor of an information handling system, a first location, a second location, and a third location from a gaze detector of the information handling system, the first and second locations corresponding with where a user is looking at a display of the information handling system, the third location corresponding with where the user is paying less attention as compared with the first and second locations;
determining that the third location is between the first and second locations;
designating a first non-power-reduced portion of the display, the first non-power-reduced portion including the first and second locations;
designating a second non-power-reduced portion of the display, the second non-power-reduced portion including the third location, the second non-power-reduced portion being designated in response to determining that the third location is between the first and second locations;

designating a power-reduced portion of the display, the power-reduced portion being exclusive of the first, second, and third locations; and receiving, by the processor, first data associated with a first pixel of an image included in the power-reduced portion;

changing, by the processor, the first data such that a first power level consumed by the display when displaying the first pixel with the changed first data is less than a second power level consumed by the display when displaying the first pixel with the first data, wherein a color/brightness/contrast level for the first pixel with the changed first data ([R',G',B']) is given as:

$$[R',G',B']=[R,G,B] \times R_{BASE} \times R_{LOC},$$

where [R,G,B] is a color/brightness/contrast level for the first pixel with the first data, $R_{BASE}$ is a base adjustment factor for the power-reduced portion of the display, and $R_{LOC}$ is a location based adjustment factor for the power-reduced portion of the display; and sending the changed first data to the display.

11. The method of claim 10, further comprising:

receiving, by the processor, second data associated with a second pixel of the image; and changing, by the processor, the second data such that a third power level consumed by the display when displaying the second pixel with the changed second data is less than a fourth power level consumed by the display when displaying the second pixel with the second data.

12. The method of claim 11, further comprising:

determining a first distance between the first pixel and one of the first and second non-power-reduced portion, wherein changing the first data is in response to determining the first distance; and determining a second distance of the second pixel from one of the first and second non-power-reduced portion, wherein changing the second data is in response to determining the second distance;

wherein a first amount of the change of the first data is greater than a second amount of the change of the second data when the first distance is greater than the second distance.

13. The method of claim 10, wherein the display comprises an organic light emitting diode type display.

14. The method of claim 13, wherein in changing the first data the method further comprises:

reducing a brightness associated with the first pixel.

15. The method of claim 13, wherein in changing the first data the method further comprises:

reducing a contrast associated with the first pixel.

16. The method of claim 13, wherein in changing the first data the method further comprises:

changing a color balance associated with the first pixel.

17. The method of claim 10, wherein the display comprises a liquid crystal display type display.

18. The method of claim 17, wherein in changing the first data the processor further reduces a brightness level of a backlight associated with the liquid crystal display.

19. A non-transitory computer-readable medium including code for performing a method, the method comprising:

receiving, at a processor of an information handling system, a first location, a second location, and a third location from a gaze detector of the information handling system, the first and second locations corresponding with where a user is looking at a display of the information handling system, the third location corresponding with where the user is paying less attention as compared with the first and second locations;

determining that the third location being between the first and second locations;

designating a first non-power-reduced portion of the display, the first non-power-reduced portion including the first and second locations;

designating a second non-power-reduced portion of the display, the second non-power-reduced portion including the third location, the second non-power-reduced portion being designated in response to determining that the third location is between the first and second locations;

designating a power-reduced portion of the display, the power-reduced portion being exclusive of the first, second, and third locations;

receiving, by the processor, first data associated with a first pixel of an image included in the power-reduced portion;

changing, by the processor, the first data such that a first power level consumed by the display when displaying the first pixel with the changed first data is less than a second power level consumed by the display when displaying the first pixel with the first data, wherein a color/brightness/contrast level for the first pixel with the changed first data ([R',G',B']) is given as:

$$[R',G',B']=[R,G,B] \times R_{BASE} \times R_{LOC},$$

where [R,G,B] is a color/brightness/contrast level for the first pixel with the first data, $R_{BASE}$ is a base adjustment factor for the power-reduced portion of the display, and $R_{LOC}$ is a location based adjustment factor for the power-reduced portion of the display; and sending the changed first data to the display.

20. The computer-readable medium of claim 19, the method further comprising:

receiving, by the processor, second data associated with a second pixel of the image;

changing, by the processor, the second data such that a third power level consumed by the display when displaying the second pixel with the changed second data is less than a fourth power level consumed by the display when displaying the second pixel with the second data;

determining a first distance between the first pixel and one of the first and second non-power-reduced portion, wherein changing the first data is in response to determining the first distance; and determining a second distance of the second pixel from one of the first and second non-power-reduced portion, wherein changing the second data is in response to determining the second distance;

wherein a first amount of the change of the first data is greater than a second amount of the change of the second data when the first distance is greater than the second distance.

* * * * *